(12) United States Patent
Montaldo et al.

(10) Patent No.: US 11,846,926 B2
(45) Date of Patent: Dec. 19, 2023

(54) NEGOTIATION-BASED METHOD AND SYSTEM FOR COORDINATING DISTRIBUTED MES ORDER MANAGEMENT

(71) Applicant: SIEMENS AKTIENGESELLSCHAFT, Munich (DE)

(72) Inventors: Ernesto Montaldo, Genoa (IT); Giovanni Venturi, Genoa (IT); Giorgio Corsini, Genoa (IT); Andrea Loleo, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 195 days.

(21) Appl. No.: 17/312,412

(22) PCT Filed: Dec. 2, 2019

(86) PCT No.: PCT/EP2019/083274
§ 371 (c)(1),
(2) Date: Jun. 10, 2021

(87) PCT Pub. No.: WO2020/120191
PCT Pub. Date: Jun. 18, 2020

(65) Prior Publication Data
US 2022/0066412 A1    Mar. 3, 2022

(30) Foreign Application Priority Data
Dec. 13, 2018    (EP) .................................... 18212349

(51) Int. Cl.
*G05B 19/406*    (2006.01)
*G05B 19/4155*   (2006.01)
(Continued)

(52) U.S. Cl.
CPC ....... *G05B 19/406* (2013.01); *G05B 19/4155* (2013.01); *G06Q 10/0631* (2013.01);
(Continued)

(58) Field of Classification Search
None
See application file for complete search history.

(56) References Cited

U.S. PATENT DOCUMENTS

| | | | | |
|---|---|---|---|---|
| 7,103,580 B1 * | 9/2006 | Batachia | ................ | G06Q 40/00 705/37 |
| 2004/0133526 A1 * | 7/2004 | Shmueli | ................ | G06Q 30/06 705/80 |
| 2010/0082500 A1 * | 4/2010 | Lutnick | ................ | G06Q 40/04 705/37 |

(Continued)

FOREIGN PATENT DOCUMENTS

| | | |
|---|---|---|
| CN | 102348239 A | 2/2012 |
| CN | 103246950 A | 8/2013 |

(Continued)

OTHER PUBLICATIONS

Cupek et al, "Agent-based manufacturing execution systems for short-series production scheduling", Aug. 2016, Computers in Industry 82, pp. 245, 252, 256 (Year: 2016).*

Almada-Lobo, "The Industry 4.0 revolution and the future of Manufacturing Execution Systems (MES)", 2015, Journal of Innovation Management JIM 3,4, pp. 16-21 (Year: 2015).*

(Continued)

*Primary Examiner* — Mohammad Ali
*Assistant Examiner* — David Earl Ogg
(74) *Attorney, Agent, or Firm* — Laurence A. Greenberg; Werner H. Stemer; Ralph E. Locher

(57) ABSTRACT

A negotiation-based method and system for managing manufacturing execution system (MES) orders within a structure of distributed systems that include at least one (Continued)

ordering system and one or several executing systems ES. The method includes the steps of: a) creating an order for a service, the order having at least one negotiable requirement; b) distributing the order to one or several ES; c) evaluating the order by each ES and automatically determining whether the order is acceptable without negotiating or generating an offer for the service to launch a negotiation process wherein said OS and ES exchange offers and counteroffers until an agreement is reached or the offer refused; d) if a least one of the ES accepts the order, the OS sends a refusal to offers received from another ES; if no ES accepts the order, the OS starts a negotiation process for the negotiable requirement with each ES.

13 Claims, 2 Drawing Sheets

(51) Int. Cl.
    *G06Q 10/0631*      (2023.01)
    *G06Q 10/087*      (2023.01)
(52) U.S. Cl.
    CPC ............... *G06Q 10/087* (2013.01); *G05B 2219/31372* (2013.01); *G05B 2219/32368* (2013.01)

(56) References Cited

U.S. PATENT DOCUMENTS

| | | | |
|---|---|---|---|
| 2012/0323795 | A1 | 12/2012 | Paparizos |
| 2017/0272894 | A1* | 9/2017 | Wang .................. H04L 67/562 |

FOREIGN PATENT DOCUMENTS

| | | | | |
|---|---|---|---|---|
| CN | 103608833 | A | | 2/2014 |
| CN | 103927628 | A | | 7/2014 |
| CN | 104299107 | A | | 1/2015 |
| CN | 107122842 | A | | 9/2017 |
| EP | 1659520 | A1 * | 5/2006 | ............ G06Q 10/10 |
| JP | 2009139979 | A | | 6/2009 |

OTHER PUBLICATIONS

Diep et al, "A Distributed Manufacturing Execution System Implemented with Agents: the PABADIS Model", Aug. 2003, IEEE International Conference on Industrial Informatics INDIN 2003, pp. 301-306 (Year: 2003).*

Sun Dechang et al:"Application of support vector regression in prediction of due date under uncertain assemble-to-order environment", Journal of Computer Applications, 2013 33( 8) : 2362 2365 238, ISSN 1001-9081, Coden Jyiidu, doi: 10.11772 [English abstract].

* cited by examiner

NEGOTIATION-BASED METHOD AND SYSTEM FOR COORDINATING DISTRIBUTED MES ORDER MANAGEMENT

BACKGROUND OF THE INVENTION

Field of the Invention

The invention relates to a negotiation-based method and system for coordinating a distributed order management of a manufacturing execution system (MES). Most recently, the term Manufacturing Operation Management (MOM) is more and more used to replace the term MES.

As defined by the Manufacturing Enterprise Solutions Association (MESA International), a MES/MOM system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication." In addition, the ISA-95 standard describes in detail the meaningful resources that a manufacturing process has to consider in order to optimize and streamline the production process. The focus is in particular on the management of materials, equipment, tools and personnel. Typically, a MES system connects, monitors, and controls complex manufacturing production processes and data flows within an enterprise. One of the main goals of a MES system is to ensure effective execution of the manufacturing operations and improve production output.

The functions that MES/MOM systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking. For example, the Siemens Corp. offers a broad range of MES/MOM products under its SIMATIC IT® product family. MES- or MOM systems, like SIMATIC IT, manage and monitor the production of a vast diversity of products.

Traditional MES systems are designed as monolithic, single-plant, and central-based applications, where a central module embraces all decision capabilities, and the communication among different MES modules is designed and implemented adhering to traditional client-server paradigms.

Following the latest industrial trends (e.g. globalization of customers and competitors) and the new initiatives (e.g. the Industry 4.0), which are born around the manufacturing world, the new generation of MES systems is requesting for a new production process paradigm. In particular, the Industry 4.0 leads to the concept called smart factory. One of the main design principles of the smart factory concept concerns decentralized decisions that is the ability for a group of systems to make decisions on their own and to perform their tasks as autonomously as possible.

This new paradigm pushes for a wider geographic distribution of production sites. Traditional MES systems are not able to cope with such a distributed environment where the manufacturing production processes are now described as a set of decomposed functionalities that are hierarchically distributed across the geographic distributed enterprise.

Among the whole set of MES functionalities, the management of orders (typically production orders) is one of the most important and critical one. The order management is the set of enterprise processes that are in charge of tracking the customer orders, providing the planning and the right resources able to fulfill the order needs. The order management, in a traditional MES system, is a single-plant and monolithic application, which encloses both, order management and order execution usually named Order Management System (or Production Order Management System). Due to the trend of having a distributed environment, the order management functionality cannot be anymore designed as a monolithic, single-plant application and has to be changed for a new concept, namely a distributed management of orders.

Such a distributed management of orders results in a set of distributed functionalities acting to achieve different production goals. In other words, the order management according to the present invention is divided in several independent functionalities that are executed in a distributed and hierarchical system (global order management and local order management as described below) contrary to the order management being a whole functionality in traditional MES. In a distributed environment, the production goal for a central, HQ-located, module that acts in order to satisfy global (enterprise) targets can for instance be different from a plant-located module that acts in order to satisfy local (on-site/on-area/on-line) targets. Examples of targets are resources optimization, production quality improvements, production time optimization, and sustainability optimization.

SUMMARY OF THE INVENTION

An objective of the present invention is therefore to provide a method and a system for an efficient and reliable management of production orders within a distributed production environment.

This objective is achieved according to the present invention by a negotiation-based method and system for coordinating a distributed MES order management according to the object of the independent claims. Dependent claims present further advantages of the invention.

In a scenario describing the context of the present invention, different modules or systems are distributed among different plants, managing locally, i.e. at the plant level, orders and having a degree of autonomy, wherein such modules or systems may comprise a plant-located functionality that proactively requests a production because:

a. The plant-located functionality knows that a production is going to be soon completed and, because of resource optimization, said plant-located functionality is configured for preventing an unplanned downtime; and/or b. The plant-located functionality knows that maintaining a production within a certain time slot reduces the production costs; and/or c. The plant-located functionality knows that maintaining a continuous (i.e. free of any breaks) production may reduce a pollution (e.g. emission of pollutants).

In order to face the new requirements resulting notably from the Industry 4.0 and the above-mentioned context, the present invention proposes in particular a negotiation-based system preferentially implemented or embedded within a MES system providing notably the latter with a set of distributed, self-descriptive, and autonomous functionalities that are able to cooperate at different enterprise levels. The negotiation-based system according to the invention proposes in particular a set of autonomous/independent and distributed functionalities that are able to act at different enterprise levels, wherein said functionalities comprise at least a local and a global order management functionality. The present negotiation-based system enables a decentralized management of orders (or services) within a MES system instead of the known prior art technique based on a monolithic approach. Said decentralization of the management of orders is realized by a mechanism that coordinates and optimizes the management of MES orders resulting in an efficient distribution and management of said MES orders according to the enterprise hierarchy.

Said mechanism is based on negotiation protocols configured for optimizing the distribution and coordination of MES functionalities in general, and order management in particular.

Typically, negotiation protocols are used to implement communication protocols where conflicts between participants may occur. A negotiation protocol is notably defined as a structured sequence of iterative steps in which offers and counter offers are performed until an agreement is reached or the negotiation is closed.

According to the present invention, the order management is a combination of a set of autonomous capabilities, wherein said set of autonomous capabilities comprises the global order management functionality, which is configured for providing global order planning and order engineering capabilities, and the local order management functionality, which is configured for providing local order planning and order execution functionalities.

In particular, the global order management functionality provides an entry point for collecting customer orders from an Enterprise Resource Planning (ERP) system, and Bill of Process (BoP) and Bill of Material (BoM) data from a Product Lifecycle Management (PLM) software (BoP and BoM data are referred, respectively, to the definition of the production process required to make a product, and the required materials). The global order management functionality also may also provide the logic to create production orders and split the production orders in sub orders. On the other hand, and in particular, the local order management functionality provides local order planning functionalities, such as scheduling of an order according to plant-specific constraints, and production order and production order steps execution. In a very extensive view, both global order management and local order management functionalities can have multiple instances running at the same time at different enterprise levels.

The global order management functionality, which is executed at the top levels (such as corporate levels) of the enterprise hierarchy, is capable of interacting with multiple and distributed local order management functionalities that are executed at the bottom levels (such as sites, areas, and production lines) of the enterprise hierarchy. In such a high-distributed system, the degree of autonomy of each "subsystem" (e.g. local order management system or global order management system of the high distributed system) increases with the complexity and the distribution of the system itself, because the more subsystems a single subsystem has to interact with, the higher the degree of autonomy is, since it increases the number of subsystems with which said single subsystem can interact with.

The present invention proposes to solve communication drawbacks that arise with the distributed management of orders by means of a negotiation-based method that is configured for automatically coordinating the distributed global and local MES order management. A negotiation process is, indeed, an efficient mechanism to solve conflicts when global order management and local order management have different and potentially opposite targets.

The previously mentioned objective is therefore in particular achieved according to the present invention by a negotiation-based method for managing MES orders, in particular production orders, within a structure of distributed systems enabling notably distributed functionalities, said structure being preferentially a hierarchical structure of distributed systems, said structure of distributed systems comprising at least one ordering system—hereafter OS—(i.e. a system that is configured for requesting a service (e.g. a production of a product), said OS providing preferentially the global order management functionality and being for instance a global order management system configured for global order planning and engineering within the MES) and one or several executing systems—hereafter ES—(i.e. a system that is able to provide the service or product to the OS, said ES providing preferentially the local order management functionality and being for instance a local order management system that might be subordinated to (or controlled by) at least one global order management system and configured for local order planning and execution), the method comprising the steps of:

a) optionally, receiving by the OS, e.g. by a global order management system, a request for a service, said service being for instance a manufacture of a product. The request might be sent by a customer (e.g. a customer system) to the OS, the latter being configured for creating, notably at a global level, an order for the requested service (e.g. at the level of an enterprise which comprises several plants that might be distributed at different locations and might each be able to provide said service).

b) creating by the OS an order for said service, wherein said order comprises at least one negotiable requirement, said service being for instance the manufacturing of a product or providing an order for manufacturing a product. As previously explained, a customer may send to a global order management system a request for manufacturing a product, and the global order management system then creates an order for manufacturing said product. According to this embodiment—called hereafter first embodiment —, the global order management system is the OS. According to another embodiment—called hereafter second embodiment-, the order might be created by a local order management system (e.g. by a local order management system at the level of a plant of said enterprise), wherein the local order management system of one or several plants requests, by means of said order, one or several global order management systems for providing a production order (e.g. additional production orders) in order to satisfy some production criteria, like reducing unplanned downtime, reducing energy consumption, or reducing an emission of pollutants. In this case, the service that is requested is not directly the manufacture of a product, but providing an order for manufacturing the product. In that case, the local order management system is the OS. Typically, in order to satisfy some production criteria, a local order management system will ask several global order management systems for providing a new order for manufacturing a product and will accept, through the negotiation process that will be described below, the best order provided by one of said global order management systems, "best" in the sense that the order which satisfies first predefined criteria will be accepted;

c) the OS distributing said order to one or several ES. In particular, the OS is configured for first determining which is or are the ES capable of providing the requested service, for instance from data stored in a database, and then distributes the order to each of said ES capable of providing said requested service. According to the first embodiment, each ES is a local order management system, for instance implemented in a plant belonging to a global enterprise. According to the second embodiment, each ES is a global order management system that is in charge of managing globally orders, e.g. production orders, for the enterprise as a whole;

d) each ES which has received said order evaluates the order. It automatically determines if the order will be accepted as such (i.e. an agreement is directly found on the basis of the provided order) or if an offer for said service has to be generated (i.e. a negotiation process involving each time one ES and one OS is launched, wherein said OS and ES will exchange sequentially offers and counter offers until an agreement is reached or the offer refused);

e) i) if a least one of the ES to which the order has been distributed accepts the order, then the OS attributes said order to this at least one ES and sends a refusal to any offer received from another of said ES. In particular, the OS attributes said order to the first ES which accepts the order; otherwise ii) if none of the ES to which the order has been distributed accepted the order, for instance after a predefined time limit, then the OS starts a negotiation process for said negotiable requirement with each of the ES to which the order has been distributed, wherein both ES and OS comprise a same negotiation model for the negotiation process of said requirement and wherein said requirement is defined by means of one or several parameters, wherein said parameters are shared among all ES and OS, but wherein the value of each parameter may differ between the different ES and OS in order to enable a same parameter having a different importance (or weight) for different ES and OS, notably in function of the time, wherein each ES involved in the negotiation process and which has not accepted the order as sent by the OS is configured for sending, notably after said predefined time limit, to the OS in response to the distributed order an offer for said service, and then in response to any subsequent counter offer received from the OS for said service, either an offer or an acceptation of said subsequent counter offer, wherein each offer sent by the ES comprises an offered value for each parameter of said requirement, wherein said offered value is determined/calculated each time the ES receives an order or a subsequent counter offer until acceptation of a counter offer by the ES or acceptation of the offer by the OS or refusal of the offer by the OS is sent, wherein the OS is configured for accepting an offer received by an ES or sending a counter offer in response to a received offer or refusing an offer until an offer or a counter offer is accepted, wherein said counter offer comprises a counter offered value for each parameter of said requirement, wherein said counter offered value is determined/calculated by the OS as long as no offer or counter offer has been accepted. According to the present invention, the offered value and the counter offered value of a parameter involved in the negotiation process are new value of said parameter automatically determined by the OS and the ES as described later on in more details when discussing the negotiation model.

Further, the objective of the present invention is solved by a negotiation-based system for coordinating a distributed order management of a manufacturing execution system (MES), said negotiation-based system comprising a structure of distributed systems, said structure being preferentially a hierarchical structure of said distributed systems, said structure of distributed systems comprising at least one OS and at least one ES, wherein the OS comprises:

a repository configured for storing planning and engineering data notably according to a MES domain model for order management. Advantageously, the repository is configured for storing a negotiation model and each negotiation thread exchanged between the ES and OS. According to the present invention, negotiation thread, set of offers and counter offers, and negotiation sequence are identical feature, having therefore the same meaning;

an order planning and engineering component, for instance a Global Order Planning and Engineering component, configured for applying a business logic for order planning and order engineering, notably for the creation of the order;

a negotiation model stored within the repository of the OS, wherein said negotiation model is configured for automatizing negotiation steps of the negotiation process between the OS and ES. The negotiation model is typically a reasoning model used by OS in order to provide negotiation capabilities;

and the ES comprises a repository configured for storing planning and execution data notably according to a MES domain model for order management. Advantageously, the repository is also configured for storing the negotiation model and each negotiation thread exchanged between the ES and OS;

an order planning component, for instance a Local Order Planning component, configured for applying the business logic for order planning. The order planning component is configured for communicating with the order planning and engineering component of the OS and is also configured for triggering an execution of an accepted order or counter offer;

an order execution component, for instance a Local Order Execution component, configured for applying the business logic for order execution when an order or counter offer has been accepted;

the negotiation model stored within the repository of the ES, wherein said negotiation model is configured for automatizing the negotiation steps of the negotiation process between the OS and ES. The negotiation model is typically a reasoning model used by OS in order to provide negotiation capabilities. The negotiation model of the ES and of the OS are identical;

wherein the negotiation-based system is configured for performing the steps of the negotiation-based method.

BRIEF DESCRIPTION OF THE SEVERAL VIEWS OF THE DRAWING

Preferred but not exclusive embodiments of the invention will now be described with reference to the accompanying drawings, which depict in.

DETAILED DESCRIPTION OF THE INVENTION

Figure 1:
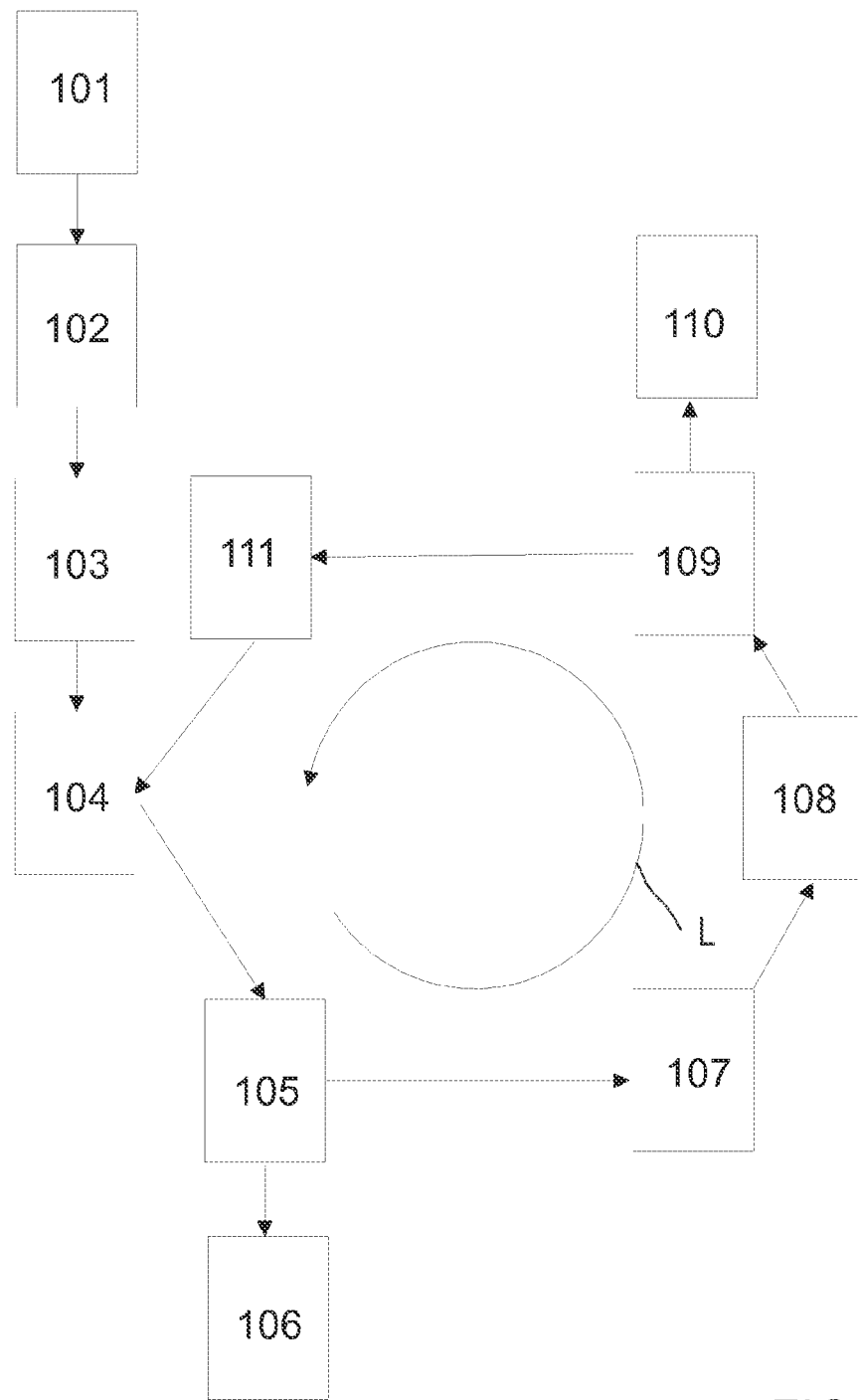
FIG. 1 schematically a preferred embodiment of the negotiation-based method according to the invention.
Figure 2:
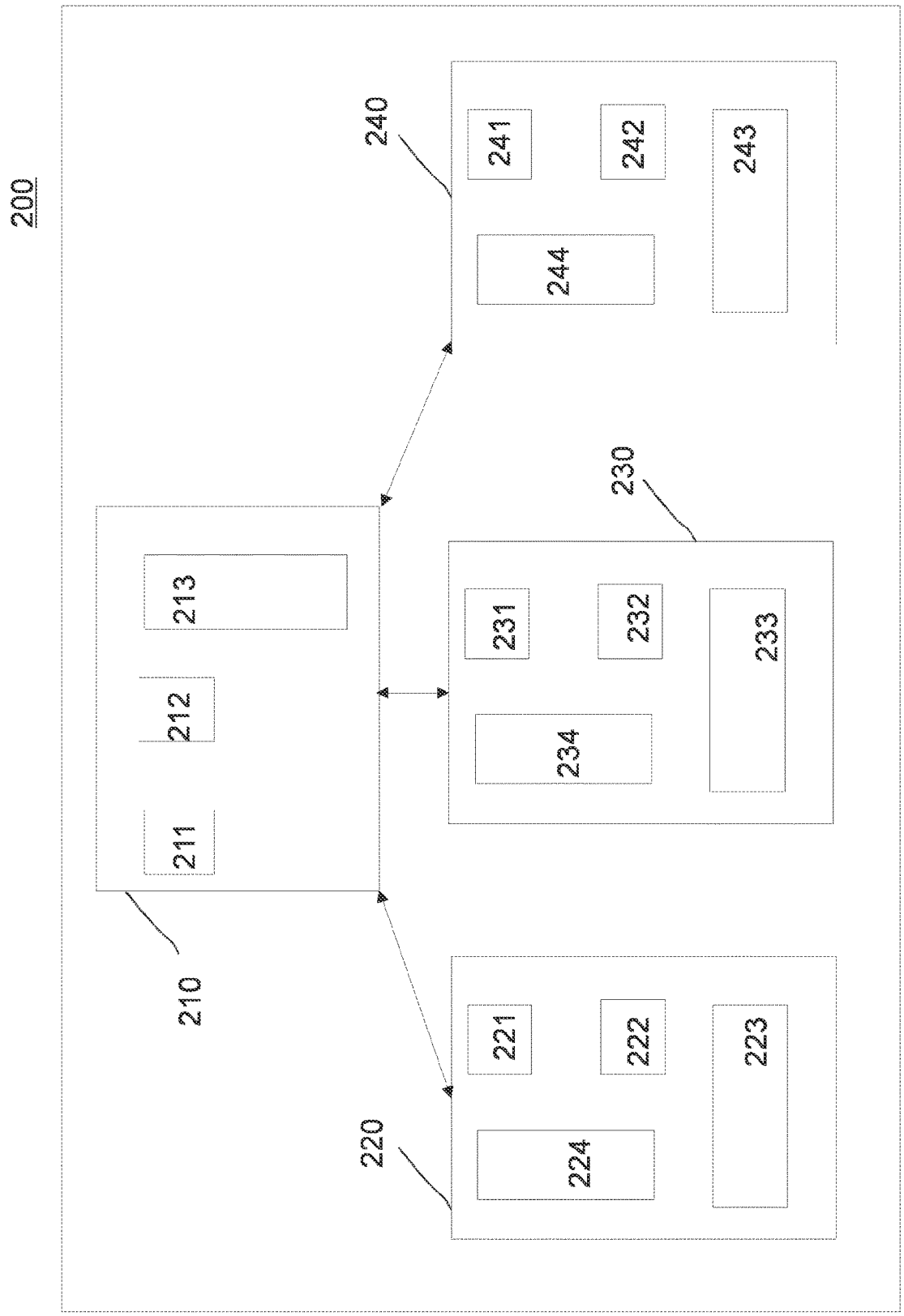
FIG. 2 schematically a negotiation-based system according to the invention.

The present invention lays in the technical field of manufacturing execution systems (MES/MOM). FIG. 1 schematically describes the steps of the negotiation-based method according to the invention and FIG. 2 provides a preferred embodiment of a negotiation-based system 200 comprising an OS 210 and several ES 220, 230 and 240. The negotiation-based system 200 may have a structural hierarchy wherein one or several OS 210 are configured for providing one or several ES 220, 230 and 240 with orders for services, wherein at least one requirement for the order (for instance one or several parameters of said order) might be negotiated during an iterative negotiation process comprising several rounds made of offers and counter offers until an agreement is found between the OS and one of the ES.

FIG. 2 shows an example of structural hierarchy for an OS 210 and several ES 220, 230, 240. Said structural hierarchy represents for instance an enterprise hierarchy comprising a set of different levels (e.g. Corporate HQ, Hub (regional HQ), Site, Area, Production Line). The OS 210 provides for instance a global order management running at the top levels of the enterprise hierarchy, such as the Corporate and/or the Hub. The ES 220, 230, 240 provides then a local order management running at the bottom levels, such as the Site, the Area, and/or the Production Line.

In a preferred hierarchical structure, there is a many-to-many relationship between OS and ES, for instance between global order management and local order management, that are distributed among different levels of an enterprise. In the following and for simplification reasons, we will nevertheless only describe a case of a one-to-many relationship, that is, one OS 210 (e.g. a global order management) deployed at one of the top levels of the enterprise hierarchy (either the HQ or the Hub) and typically running as a single instance for managing order at a "global" level, and multiple ES 220, 230 240 (e.g. local order management systems) deployed at one or more bottom levels of the enterprise hierarchy (e.g. the Site, the Area, or the Production Line) running as multiple instances for managing orders at a "local" level.

At a certain point in time, the OS 2010 which is responsible for global order planning and order engineering at the enterprise level, needs to process a request for producing a certain amount of products that are related to a certain amount of customer orders. These products have to be produced under certain requirements that are for instance:
  a production quality requirement;
  a time range requirement: e.g. a customer order production has to be completed within said time period;
  a pollution requirement: e.g. the production has to satisfy some pollution requirements;
  an energy consumption requirement: e.g. the production has to optimize the energy consumption as much as possible;
  etc.

However, several plants within lower levels of the enterprise hierarchy are able to produce the required products by providing local order planning and execution functionalities through their ES 220, 230 and 240. Each plant is therefore able to provide the requested products under certain conditions that are for instance:

a quality condition: e.g. not all the plants are able to provide the same production quality because some plants are fully automated while some others are fully manual or in a "mixed mode";
  production time range condition: e.g. not all the plants are able to fulfill the production in the required amount of time because the equipment they use are different among each other and the availability of each of them is different;
  a pollution condition: e.g. not all the plants are able to satisfy pollution requirements, because different regions have different regulations when considering a worldwide enterprise;
  energy consumption condition: e.g. not all the plants are able to provide the same energy consumption optimization, because different regions have different contracts with different energy providers when considering a worldwide enterprise;
  etc.

According to the already described first embodiment, the process related to a request for production is therefore initiated at the enterprise level by the OS. Nevertheless, this process could also be initiated at a lower level, e.g. by one or more plants in a sense that one or several plants may ask for additional production orders, e.g. in order to reduce unplanned downtime, and/or to reduce energy consumption, and/or to reduce emission of pollutants. This corresponds to the so-called second embodiment, wherein a local order management system is the OS that creates an order for a service, said service being "providing a (additional) production order", and said order being distributed to different global order management systems within the enterprise to negotiate the attribution of a new order.

In order to optimize and coordinate the multiple and diverse interactions that arise in such a distributed scenario of a MES environment as shown in FIG. 2 and involving global order management functionalities embedded in OS and local order management functionalities embedded in the different ES, the present invention proposes a negotiation-based method for efficiently optimizing and coordinating a distribution of orders among the different ES.

Negotiation is defined as (D. G. Pruitt, Negotiation Behavior. Academic Press, 1981): "A process by which a joint decision is made by two or more parties. The parties first verbalize contradictory demands and then move towards agreement by a process of concession making or search for new alternatives."

According to the present invention, the negotiation is a bilateral process that happens between an OS, for instance a global order management system, and ES, for instance a local order management system, within a MES environment. The negotiation process according to the invention uses notably a negotiation protocol and a set of negotiation functions, and is based on a set of mutual interactions based on a set of parameters representing the knowledge base. The knowledge base is the set of parameters used during negotiation. In a simple case, these parameters are the same among the global and local functionalities (i.e. the knowledge base is the same for the parties who entered into a negotiation process, but each party gives a different importance to each of said parameters and for each party—e.g. ES or OS—these parameters can have different values too, wherein the value of the parameter is negotiated during the negotiation process). Optionally, in very complex negotiation cases, each negotiator does not share its own set of parameters.

According to the present invention, the negotiation process involves the OS and the ES in an iterative process that is organized in several rounds made of offers and counter offers with the aim for the OS to reach a common agreement with an ES. When the agreement is reached with an ES or its offer refused by the OS, then the negotiation is considered terminated.

For enabling said negotiation process, each ES and OS comprises notably a negotiation model, which is the same for the ES and the OS. The negotiation model is a reasoning model on which the negotiation process is based on. The negotiation model provides in particular a business logic configured for managing the negotiation process. Preferably, the negotiation model includes the decision about what local order management modules are available and if they are able to satisfy the required production and under which conditions, wherein said conditions are determined at the end of the negotiation process according to the results of the negotiation, the OS knowing then the available ES that are able to satisfy the required production and under which conditions. Preferentially, the negotiation model is configured for enabling an automatic creation of said order for a service, as well as offers and counter offers, and is configured for automatically determining when an agreement is reached, or whether the negotiation has to be closed (e.g. offer is refused).

The order sent by the OS to the ES comprises negotiable requirements which are defined by one or several parameters whose values are negotiated during the negotiation process. Said parameters used in the negotiation process are shared among all the ES and OS, in particular both on a global and local order management level. This means that the parameters are the same for all ES and OS, but each parameter may have a different importance between an OS and an ES, and also a different importance between two ES, in particular between each of the ES. Preferentially, each parameter may vary in function of time during the negotiation, since they may reflect a real-time situation (e.g. real-time amount of available matter for a product). For example, the number of orders that can be managed by a local order management module can vary over the time because of equipment availability or equipment unavailability.

The parameters taken into account by the negotiation model are notably:
the production quality parameter, whose value defines a quality that needs to be satisfied by a product during and/or at the end of the production process;
the time range parameter, which defines the time period within which a production order has to be completed;
the pollution constraint parameter which defines pollution constraints that have to be satisfied during the production process;
the energy consumption parameter which defines the energy which is consumed by the production process.

FIG. 2 presents in more details the OS 210 and the ES 220, 230, 240 of a negotiation-based system 200 according to the invention. The OS 210, which is for instance a global order management system, comprises preferentially
a repository 211, wherein in particular all the planning and engineering data is stored according to a MES domain model for order management. This repository might be further configured for storing the negotiation model and each negotiation thread, and preferentially any data required by the negotiation model;
an order planning and engineering component 212 configured for applying a business logic for order planning and order engineering preferentially at the global level of the enterprise. The order planning and engineering component 212 is configured for using the negotiation model 213 and for storing order planning and engineering data in the repository 211. The order planning and engineering component 212 may comprise a processor and optionally a memory; and
the negotiation model 213 which is the reasoning model used by the order planning and engineering component 212 in order to provide negotiation capabilities during the negotiation process. The negotiation model 213 may further comprise a negotiation function, a negotiation protocol, a negotiation strategy, and a negotiation tactic. In particular, the OS 210 uses data of the repository 211 for running the negotiation model 213.

The ES 220, 230, 240, which is for instance a local order management system, comprises for instance:
repository 221, 231, 241, wherein in particular all the planning and execution data is stored according to a MES domain model for order management. This repository 221, 231, 241 might be further configured for storing the negotiation model and each negotiation thread, and preferentially any data required by the negotiation model;
an order planning component 222, 232, 242, configured for applying a business logic for order planning preferentially at a local level of the enterprise. The order planning component 222, 232, 242, and the order planning and engineering 212 are configured for communicating with each other, notably during the negotiation process in order to establish and exchange an offer and/or counter offer. The order planning component 222, 232, 242 is further configured for triggering an order execution, using the negotiation model 213, and storing order planning data in the repository 221, 231, 241. The order planning component 222, 232, 242 may comprise a processor and optionally a memory;
an order execution component 224, 234, 244 configured for applying said business logic for order execution, notably at a local level of the enterprise. In particular, the order execution component communicates with the order planning component in order to receive from the latter a request for order execution, and with one or several execution systems of the plant, like a manufacturing robot;
a negotiation model 223, 233, 243, which is the reasoning model used by the order planning component 222, 232, 242 in order to provide negotiation capabilities during the negotiation process. The negotiation model 223, 233, 243 may further comprise a negotiation function, a negotiation protocol, a negotiation strategy, and a negotiation tactic. In particular, the ES 210 uses data of the repository 211 for running the negotiation model 223, 233, 243.

The negotiation model used by the ES and OS aims notably to optimize and coordinate the distribution of orders within a MES system. Negotiation models are known in the art, and therefore, the skilled person may decide which negotiation model is suitable for a specific negotiation process. The present invention will be illustrated by taking a negotiation model based on techniques disclosed by H. Raiffa (H. Raiffa. *The Art and Science of Negotiation*. Harvard University Press, Cambridge, USA, 1982) and C. Sierra et al. (C. Sierra, P. Faratin, and N. R. Jennings. *A Service-Oriented Negotiation Model between Autonomous Agents. Lecture Notes in Computer Science—Collaboration between Human and Artificial Societies*, 1999). Of course, the present invention is not limited to this specific model and other negotiation models might be chosen depending on the negotiation that has to be achieved.

In order to illustrate the present invention, the negotiation model will be described by considering an OS which is responsible for global order management and an ES which is responsible for local order management. The negotiation model might be then described as follows:

Let i be the negotiation partners, i.e. the OS and the ES, with i∈(g, l), where g stands for global (i.e. represents the OS) and l stands for local (i.e. represents the ES), and j the parameters under negotiation with j∈(1, 2, ..., N).

Let $x_j \in [min_j, max_j]$ be a generic value for the parameter j. Said generic value might be for instance predefined in the repository 211 of the OS and 221 of the ES.

Let $V_j^i$ be a scoring function for global order management by the OS (i=g) or local order management by the ES (i=l) wherein the OS and the ES are the partners involved in the negotiation, and where $V_j^i$: $[min_j, max_j] \to [0,1]$, wherein $min_j$ and $max_j$ are respectively the minimum and maximum value that the parameter j may take during the negotiation process between the concerned negotiation partners, wherein for a negotiation partner p, $min_j^p$ is the minimum value that the parameter j may take for said negotiation partner p and $max_j^p$ is the maximum value that the parameter j may take for the negotiation partner g. When considering two negotiation partners l and g in negotiation then $[min_j, max_j]$ might be defined as $min_j = min(min_j^l, min_j^g)$ (i.e. it takes the minimal value among $min_j^l$ and $min_j^g$) and $max_j = max(max_j^l, max_j^g)$ (i.e. it taxes the maximal value among $max_j^l$ and $max_j^g$). The scoring function is a function that calculates the score that the negotiation partner i gives to a parameter j within a range [0, 1] of accepted values. Each partner has to assign a relevance to each parameter (which means that at different enterprise levels a same parameter can contribute differently in the target achievement). This relevance that a partner i, which is involved in the negotiation, confers to a parameter j is defined as $w_j^i$, where $\Sigma_{j=1}^N w_j^i = 1$. The scoring function is then defined as:

$$V^i(X) = \sum_{j=1}^N w_j^i V_j^i(x_j), \text{ where } X = (x_1, x_2, \ldots, x_N).$$

The scoring function verifies that given a negotiation partner g and a negotiation partner l, which are negotiating for the parameter j, wherein $m1_j$ and $m2_j$ are two values of the parameter j, then the scoring function satisfies the following conditions: if $m1_j, m2_j \in [min_j, max_j]$ and $m1_j \geq m2_j$ then $V_j^g(m1_j) \geq V_j^g(m2_j)$ if and only if $V_j^l(m1_j) \leq V_j^l(m2_j)$.

The negotiation model is configured for implementing a set of alternative sequences of offers and counter offers of values for the parameters j until an offer, or a counter offer, is accepted, or an offer refused. This sequence of offers and counter offers is illustrated by FIG. 1 and will be described in detail below.

In particular, at the time instant t the negotiation partner l receives an order from the negotiation partner g comprising values $x_j$ for the parameters j. At the time instant t+1 the negotiation partner l may either make an offer to g with amended values $x_j$ or accept the order sent by the negotiation partner g. In response, the negotiation partner g may accept the offer, refused the offer or make a counter offer at the time t+2. The initial order at the time t and each offer (or counter offer) is made of a vector of values and can be represented as $X(g,l,t) = x_1(g,l,t), \ldots, x_N(g,l,t)$ ($x_j(a,b,c)$ representing the value x of the parameter j proposed by the negotiation partner a to the negotiation partner b at the time c). For instance, when the negotiation partner l receives from the negotiation partner g at the time t the initial order comprising the value $x_j(g,l,t)$ for the parameter j, it will evaluate, by using its scoring function, its offer at the time instant t+1 against the received order at the time instant t using:

$$\begin{cases} \text{if } V(X(g, l, t)) \geq V(X(l, g, t+1)) \text{ then accept} \\ \quad X(l, g, t+1) \text{ otherwise} \end{cases}$$

i.e. if the order (or any counter offer) made by the OS has a scoring function whose value is higher than the scoring function value which would be obtained for the subsequent offer made by the ES in response to the order, then the order is accepted, otherwise, the offer is sent to the OS which will proceed to its evaluation using the same scheme until an offer, or a counter offer is accepted, or until the OS accepts an offer of another ES and refused therefore the offers of the other ES.

In order to prepare an offer resp. a counter offer, the negotiation partners l, resp. g, automatically determines a new value for one or several negotiable parameters involved in the initial order. Said new value is notably determined in function of a known deadline for completing the production of a requested product, and/or a current quantity/amount of an available resource, and/or in function of a previous value change made for said parameter by the other negotiation partner. Some tactics are:

In particular, the determination of a new value in function of a known deadline for completing the production of a requested product might be realized as follows: each negotiation partner changes the value of at least one, preferentially all, of the parameters involved in the negotiation process according to the time that has elapsed since the sending and reception of the initial order and a deadline represented by a constant $t_{max}$ that defines the time within which the negotiation must be completed:

$x(g,l,t) = \{min_j^g + \alpha_j^g(t)(max_j^g - min_j^g)$ in case the scoring function is a decreasing function $x(g,l,t) = \{min_j^g + (1-\alpha_j^g(t))(max_j^g - min_j^g)$ in case the scoring function is an increasing function wherein the function $\alpha_j^g(t)$ satisfies:

$\alpha_j^g(t) \in [0,1]$ and $\alpha_j^g(t_{max}) = 1$ $\alpha_j^g(0) = k_j^g$ and is defined by:

$$\alpha_j^g(t) = k_j^g + \left(\frac{\min(t, t_{max})}{t_{max}}\right)^{\frac{1}{\beta}}$$

wherein $k_j^g$ is the value of the scoring function when the time t is equal to 0. It is usually an empirical value inferred from the experience. β is the convexity degree of the negotiation process. The convexity defines how quickly the end of the negotiation is reached. If β>1, then the negotiator tries to reach the end of the negotiation very quickly, whereas with β<1 the negotiator tries to reach said end very slowly and each offer comprises for a parameter a negotiated value that is close to the value of the previous offer.

The above-mentioned approach for determining new values for the parameters in function of the time $t_{max}$ within which the negotiation must be completed is one example among many suitable examples for determining new values for the parameters j during negotiation process. Other strategies might be adopted for determining new values for the parameters j during the negotiation processes.

FIG. 1 illustrates in more details the negotiation process according to the invention. The negotiation process is determined by a negotiation protocol which is comprised within the negotiation model and might be stored in the repository. The negotiation protocol is notably used to formalize, in a rigorous way, how a set of offers and counter offers has to happen for the ES and OS.

According to a preferred negotiation protocol, the negotiation process 100 follows the following steps:

- at step 101, the OS creates an order for a service. Said service is typically a manufacturing of a product, which has for instance to be achieved within a predefined time period, e.g. $t_{max}$. The order comprises a negotiable requirement defined by one or several parameters whose values are negotiable during the negotiation process. The negotiation process of the OS is initialized through the creation of this initial order;
- at step 102, the OS sends said order to one or several ES. In particular, the OS is capable of determining which ES are going to take part to the negotiation process, for instance by determining from characteristics of ES stored in its repository or a database which ES is capable of manufacturing said product. Once the OS has determined the ES whose characteristics enable the latter to manufacture the product or to provide the required service, then it sends said order to said ES;
- at step 103, each ES determined by the OS as being capable of providing said service or said manufacturing of the product receives the order. Each ES may receive several order, for instance from a same or from several OS. In particular, each ES initiates then its negotiation process for each order received;
- at step 104, each ES that has received the order evaluates the latter. In particular, each ES determines autonomously the next action with respect to the received order. The next action is in particular either an acceptation of the order as described, or a refusal of said order and the sending of an offer for the service ordered by the OS via the sent order;
- at step 105, the ES either accepts the order or refuses the order after evaluation of the latter. An acceptation of the order means that an agreement has been reached without negotiating the negotiable requirement of the order. The ES accepting the order directly communicates said information to the OS, which in return attributes said order to the ES at step 106. Preferentially, the OS attributes the order to the first ES which has communicated its acceptation of the order, in case several ES accept said order. Once the OS has attributed the order to an ES, then none of the following offer that might be received from ES involved in the negotiation process will be accepted by the OS, which means that each subsequent offer received from an ES will receive in return a refusal sent by the OS. A refusal of the order triggers notably a determination of new values (offered values) for at least one parameter of the negotiable requirement. This calculation of new values is performed by each ES which refused the order. This calculation of an offered value for a parameter of the negotiable requirement is realized by each ES having refused the order by computing or running its negotiation model;
- at step 107, each ES having refused the order sends an offer to the OS, wherein said offer comprises an offered value for at least one parameter of the negotiable requirement;
- at step 108, the OS receives an offer from each ES involved in the negotiation process and that has not accepted the order, and evaluates each of said offers. In particular, the OS determines autonomously the next action with respect to each of the received offers. The next action is in particular either an acceptation of one of said offers as described at step 109, or a refusal of said offer (step 110) and the sending of a counter offer (step 111) to the ES;
- at step 109, the OS either accepts an offer or refuses the offer after evaluation of the latter. The OS preferentially uses said scoring function in order to determine whether an offer has to be accepted or not. Preferentially, in case several offers are acceptable, then the OS may accept the acceptable offer received first, or it may accept the acceptable offer with the highest value of the scoring function. At step 110, the OS attributes the order to the ES whose offer has been accepted and informs the latter. Once the OS attributed the order to the ES whose offer has been accepted, then it sends to any other ES whose offer has not been accepted a refusal of the offer, which notably triggers a closing of the negotiation process between the ES receiving the refusal and the OS. As long as no offer has been accepted, a refusal of an offer triggers notably a determination of new values (counter offered values) for at least one parameter of the negotiable requirement. This calculation of new values is performed by the OS as long as none of the received offer has been accepted. This calculation of a counter offered value for a parameter of the negotiable requirement is realized by the OS by computing or running its negotiation model. In particular, the OS determines a counter offer for each offer received and refused, wherein the counter offers might be different from each other depending on the counter offered values comprised within said counter offers;
- at step 111, each ES whose offer has not been accepted by the OS receives a counter offer sent by the OS, wherein said counter offer comprises a counter offered value for at least one parameter of the negotiable requirement. In particular, each ES may receive several counter orders, for instance from a same or from several OS;

the method then returns to and continues with step 104, which is applied to the counter offer instead of the order, i.e. wherein each ES that has received a counter offer evaluates the latter, wherein each ES having received said counter offer processes the latter as it did for the order following the subsequent steps 105-111 until a counter offer is accepted, or an offer is accepted, or a refusal for an offer is received. In other words, the method according to the invention comprises therefore a loop L, wherein the steps 104-111 are iteratively repeated for each counter offer until a counter offer is accepted by an ES, or an offer is accepted by the OS, or a refusal for an offer is received by an ES. During this iteration of steps 104-111, the value of the parameters under negotiation are continuously updated (or reevaluated) by the OS and the ES notably in function of a current production situation (e.g. taking account of a variation of an amount of available matter or taking account of a failure of a machine of a plant) so that the different negotiations between the OS and each ES may give rise to a different result for said parameters under negotiation.

In order to better illustrate the negotiation-based method, the latter will be applied in the following to a simplified manufacturing case wherein one considers one OS being a global order management system and two ES being local order management systems.

The global order management system is interested in producing a product according to different sets of custom orders, wherein said different sets correspond to different requirements of customers.

According to a first case, a first set of custom orders requires a production of the product wherein the quality of production is the most important requirement for the production, whereas according to a second set of custom orders corresponding to a second case, the most important requirement for said production is the production time optimization. Additional requirements, such as energy consumption optimization requirement, energy consumption optimization requirement, and pollution requirement satisfaction, are also provided.

Each of these requirements are negotiable requirements comprising at least one parameter whose value might be negotiated. The global order management system and the local order management system have each an own set of values for said parameter and an own associated weight for this parameter, said weight being a function of the importance said parameter has for said local or global order management system.

The scoring function is for instance then defined as follows for the global and local order management systems:

$$\begin{cases} V^i(X) = \sum_{j=1}^{N} w_j^i V_j^i(x_j) = \sum_{j=1}^{N} w_j^i \frac{x_j}{1-(x_j-\max_j)e^{-\gamma x_j}} \\ \gamma = -50 \text{ for Global Order Management} \\ \gamma = -0,01 \text{ for Local Order Management} \end{cases}$$

wherein $\gamma$ value is related to the speed with which the scoring function increases, greater values of $\gamma$ meaning that the scoring function increases softly, while lower values of $\gamma$ mean that the scoring function increases suddenly. Both values might be heuristic values.

The value for the parameters regarding the required quality, the required production time optimization, the pollution requirement satisfaction and the required energy consumption is given by the following tactic function:

$x(g,l,t)_j = \{\min_j^g + (1-\alpha_j^g(t))(\max_j^g - \min_j^g)\}$ (in case the scoring function is an increasing function)

or $x(g,l,t)_j = \{\min_j^g + \alpha_j^g(t)(\max_j^g - \min_j^g)\}$ in case the scoring function is a decreasing function where $$\alpha_j^g(t) = k_j^g + \left(\frac{\min(t, t_{max})}{t_{max}}\right)^{\frac{1}{\beta}}$$

and $\beta$ is equal to 0.1 for local order management and 0.01 for global order management. Preferentially, these values for $\beta$ are heuristic values.

First Case (Quality Constraint)

For the first case, a HQ of an enterprise is for instance interested in producing with the highest quality possible. The parameter defining the required Quality is consequently the most important one (its weight, for instance 0.4, is the highest compared to the values of the other parameters defined for the other requirements—see Table 1), and the values for the "Required Quality" parameter are the highest. The other parameters for the other requirements are less important as shown in Table 1.

TABLE 1

| Global Order Management | | | |
|---|---|---|---|
| Required Quality | Production Time Optimization | Pollution Requirement Satisfaction | Energy Consumption Optimization |
| 70 | 60 | 40 | 30 |
| 75 | 65 | 45 | 35 |
| 80 | 70 | 50 | 40 |
| 85 | 75 | 55 | 45 |
| 90 | 80 | 60 | 50 |
| 95 | 85 | 65 | 55 |
| 100 | 90 | 70 | 60 |
| Weights 0.4 | 0.3 | 0.2 | 0.1 |

Table 1 shows for the "Required Quality" parameter, for the "Production Time Optimization" parameter, for the "Pollution Requirement Satisfaction" parameter and for the "Energy Consumption Optimization" parameter different sets of values, which might be stored within the registry of the global order management system for calculating said scoring function. In addition, the weight of each parameter is also provided.

Within said enterprise, a first plant may have a configuration wherein the production quality is the most important production requirement, that is the "Required Quality" parameter defined within a registry of the local order management system of the plant has the highest weight (for instance is equal to 0.4) compared to the others production parameters which are less important, and as given in Table 2. As for Table 1, Table 2 shows different sets of values for the "Required Quality" parameter, the "Production Time Optimization" parameter, the "Pollution Requirement Satisfaction" parameter and the "Energy Consumption Optimization" parameter as defined within the local order management system of the first plant.

TABLE 2

| Local Order Management 1 | | | |
|---|---|---|---|
| Required Quality | Production Time Optimization | Pollution Requirement Satisfaction | Energy Consumption Optimization |
| 70 | 40 | 30 | 60 |
| 75 | 45 | 35 | 65 |
| 80 | 50 | 40 | 70 |
| 85 | 55 | 45 | 75 |
| 90 | 60 | 50 | 80 |
| 95 | 65 | 55 | 85 |
| 100 | 70 | 60 | 90 |
| Weights 0.4 | 0.2 | 0.1 | 0.3 |

Within said enterprise, a second plant may have a configuration wherein the "Pollution Requirements Satisfaction" parameter and the "Energy Consumption Optimization" parameters, respectively with weights 0.25 and 0.45, are the most important parameters (see Table 3). This could happen because, for example, of some political restrictions about pollution, due to the geographical position of the second plant, or because of some local plant constraints about the energy consumption. Quality in production is, for said second plant, not a relevant parameter because, for example, the production is fully manual, and some high-quality operations are not possible. Table 3 shows the different sets of values for the "Required Quality" parameter, the "Production Time Optimization" parameter, the "Pollution Requirement Satisfaction" parameter and the "Energy Consumption Optimization" parameter as defined within the local order management system of the second plant.

Both the first plant and the second plant are capable of producing said product. The negotiation between the global order management system and the local order management system of both the first and second plant enable to efficiently determine the plant to which the order for producing said product will be attributed and under which conditions, i.e. for which values of the parameters.

TABLE 3

| | Local Order Management 2 | | | |
|---|---|---|---|---|
| | Required Quality | Production Time Optimization | Pollution Requirement Satisfaction | Energy Consumption Optimization |
| | 40 | 40 | 60 | 70 |
| | 45 | 45 | 65 | 75 |
| | 50 | 50 | 70 | 80 |
| | 55 | 55 | 75 | 85 |
| | 60 | 60 | 80 | 90 |
| | 65 | 65 | 85 | 95 |
| | 70 | 70 | 90 | 100 |
| Weights | 0.1 | 0.2 | 0.25 | 0.45 |

The negotiation between the global order management system and the local order management system of the first plant is reported in Table 4, while the negotiation between the global order management system and the local order management system of the second plant is reported in Table 5.

TABLE 4

| | Global offers to Local 1 | Local 1 offers to Global | Global offers to Local 1 | Result |
|---|---|---|---|---|
| t = 0 | −50.9117 | | | |
| t = 1 | | 4.517394 | | |
| t = 2 | | | 4.592308 | Local 1 and Global gets an agreement → negotiation is over |

TABLE 5

| | Global offers to Local 2 | Local 2 offers to Global | Global offers to Local 2 | Result |
|---|---|---|---|---|
| t = 0 | −1.00464 | | | |
| t = 1 | | 3.178501 | | |
| t = 2 | | | 11.6859 | |
| t = 3 | | | | Withdrawn |

The negotiation process ends therefore in favor of the local order management system of the first plant which gets an agreement with the global order management system for producing the product according to said set of customer orders having the quality constraint as the main requirement.

As a remark, the values provided in the presented tables in function of the time are obtained by applying the scoring function of the negotiator that receives an offer to each value of the considered parameter x calculated for different values of the time t, and which is sent by the other negotiator. Each value of the parameter x is calculated by applying the tactic function considering the minimum and the maximum values for the parameter x, wherein the system first calculates, for each parameter and for each value of the time t, the values of the tactic function (the tactic function depends on the range of each parameter and on the time t), wherein the tactic function is calculated for both the values that are received and the values that will be sent as counter offer, and second, it calculates each term of the scoring function. The scoring function is a weighted sum of elements that are calculated considering the x values that were previously calculated applying the scoring function.

Second Case (Production Time Optimization)

For the second case, the HQ of said enterprise is for instance interested in producing with the highest production time optimization possible (i.e. as fast as possible). The "Production Time Optimization" parameter is then the most important one (a weight of 0.6 is for instance attributed to this parameter within the registry of the global order management system of the HQ) and the set of values for the "Production Time Optimization" parameter are the highest as shown in Table 6. The other parameters are less important, which means that the associated weight value is lower in comparison the value for the weight associated to the Production Time Optimization parameter, as illustrated in Table 6.

TABLE 6

| | Global Order Management | | | |
|---|---|---|---|---|
| | Required Quality | Production Time Optimization | Pollution Requirement Satisfaction | Energy Consumption Optimization |
| | 50 | 70 | 40 | 30 |
| | 55 | 75 | 45 | 35 |
| | 60 | 80 | 50 | 40 |
| | 65 | 85 | 55 | 45 |
| | 70 | 90 | 60 | 50 |
| | 75 | 95 | 65 | 55 |
| | 80 | 100 | 70 | 60 |
| Weights | 0.2 | 0.6 | 0.1 | 0.1 |

This time, the first plant has not the same desires about production: the highest weight is defined within the local order management system for the "Required Quality" parameter which has a weight that is equal to 0.4 (see Table 7). The others production parameters are less important as shown in Table 7, with weight values which are below the value of the weight defined for the production quality.

TABLE 7

| | Local Order Management 1 | | | |
|---|---|---|---|---|
| | Required Quality | Production Time Optimization | Pollution Requirement Satisfaction | Energy Consumption Optimization |
| | 70 | 30 | 30 | 60 |
| | 75 | 35 | 35 | 65 |
| | 80 | 40 | 40 | 70 |
| | 85 | 45 | 45 | 75 |
| | 90 | 50 | 50 | 80 |
| | 95 | 55 | 55 | 85 |

TABLE 7-continued

Local Order Management 1

|  | Required Quality | Production Time Optimization | Pollution Requirement Satisfaction | Energy Consumption Optimization |
|---|---|---|---|---|
|  | 100 | 60 | 60 | 90 |
| Weights | 0.4 | 0.1 | 0.1 | 0.2 |

At the opposite, the second plant is configured for optimizing energy consumption and its local order management system comprises therefore an "Energy Consumption Optimization" parameter whose weight equal to 0.5 is higher than the weight associated to each of the other parameters (see Table 8). Indeed, the others parameters are less important.

TABLE 8

Local Order Management 2

|  | Required Quality | Production Time Optimization | Pollution Requirement Satisfaction | Energy Consumption Optimization |
|---|---|---|---|---|
|  | 40 | 65 | 60 | 70 |
|  | 45 | 70 | 65 | 75 |
|  | 50 | 75 | 70 | 80 |
|  | 55 | 80 | 75 | 85 |
|  | 60 | 85 | 80 | 90 |
|  | 65 | 90 | 85 | 95 |
|  | 70 | 95 | 90 | 100 |
| Weights | 0.1 | 0.5 | 0.2 | 0.2 |

The negotiation between global order management system and the local order management system of the first plant and of the second plant is reported respectively in Table 9 and Table 10.

TABLE 9

|  | Global offers to Local 1 | Local 1 offers to Global | Global offers to Local 1 | Result |
|---|---|---|---|---|
| t = 0 | 1.397227 |  |  |  |
| t = 1 |  | 3.919193 |  |  |
| t = 2 |  |  | −0.60848 |  |
| t = 3 |  |  |  | Withdrawn |

TABLE 10

|  | Global offers to Local 2 | Local 2 offers to Global | Global offers to Local 2 | Result |
|---|---|---|---|---|
| t = 0 | −60.0532 |  |  |  |
| t = 1 |  | 3.94459 |  | Local 2 and Global gets an agreement → negotiation is over |
| t = 2 |  |  |  |  |
| t = 3 |  |  |  |  |

This time, the negotiation process ends in favor of the local order management system of the second plant getting an agreement with the global order management system for producing the product according to the set of customer orders having, as main constraint, the production time optimization.

In more complicated situations, wherein more than one local order management system are involved in the negotiation process, the global order management system is configured for:
- concluding an agreement with the local order management system for which the negotiation process has the smaller number of iterations until acceptation of an offer or counter offer. For instance, it will typically correspond to the local order management system having first provided an offer which is accepted or having first accepted a counter offer. Advantageously, a smaller number of iteration steps suggests a major affinity between the negotiation partners;
- concluding an agreement with the local order system for which the scoring function had the highest mean value during the negotiation process, in case that the negotiation process with more than one local order management system had the same number of iterations.

In conclusion, the present invention advantageously provides a new concept for optimizing and coordinating distributed orders within a MES system. It therefore provides a novel approach to coordinate autonomous, self-descriptive, and distributed MES functionalities by means of negotiation protocols. In particular, it may be used for optimizing a distribution of MES functionalities according to the new requirements given by new industrial trends (e.g. globalization of customers and competitors) and the new initiatives (e.g. the Industry 4.0), it optimizes resource utilization, reduces the time of production and improves the manufacturing plant utilization.

The invention claimed is:

1. A method of managing manufacturing execution system (MES) orders within a structure of distributed systems having at least one ordering system (OS) and one or a plurality of executing systems (ES), the method comprising:
   a) creating by the OS an order for a service for producing a product, the order including at least one negotiable requirement being defined by a parameter selected from the group consisting of a production quality parameter, a time range parameter, a pollution constraint parameter, and an energy consumption parameter related to the production of the product;
   b) distributing the order to one or several ES;
   c) evaluating the order by each of the one or several ES having received the order, and automatically determining whether the order should be accepted without negotiating the negotiable requirement or an offer should be created for the service in order to launch a negotiation process, wherein the OS and the respective ES will sequentially exchange offers and counteroffers until an agreement is reached or until the offer is refused;
   d) (i) if a least one of the ES accepts the order for producing the product, assigning the order by the OS to the accepting ES and sending a refusal to any offer received from another ES; or
   (ii) if none of the one or several ES to which the order has been distributed has accepted the order for producing the product, starting by the OS a negotiation process for the negotiable requirement with each of the one or several ES to which the order has been distributed.

2. The method according to claim 1, wherein the ES and the OS comprise a same negotiation model for carrying out the negotiation process of the negotiable requirement and wherein the negotiable requirement is defined by one or several parameters, wherein the parameters are shared among all ES and OS, but wherein a value of each parameter may differ between different ES and OS in order to enable the same parameter having a different importance or weight for different ES and OS.

3. The method according to claim 2, wherein each ES involved in the negotiation process and which has not accepted the order as sent by the OS is configured for sending to the OS, in response to the distributed order an offer for the service, and then in response to any subsequent counteroffer received from the OS for the service, either an offer or an acceptance of the subsequent counteroffer, wherein each offer sent by the ES comprises a new value, being an "offered value" for each parameter of the requirement, wherein the offered value is determined each time the ES receives an order or a subsequent counteroffer until an agreement is reached by the ES accepting a counteroffer or the OS accepting an offer or a refusal is sent to the ES by the OS.

4. The method according to claim 3, which comprises, by the OS, accepting an offer received from an ES or sending a counteroffer in response to a received offer or sending a refusal in response to a received offer until an offer or a counteroffer is accepted, wherein the counteroffer comprises a new value being a "counteroffered value" for each parameter of the negotiable requirement, wherein said counteroffered value is determined by the OS as long as no offer or counteroffer has been accepted.

5. The method according to claim 2, wherein parameter values vary as a function of time, representing a real time situation of a production process or a manufacturing situation within the MES.

6. The method according to claim 2, wherein the negotiation model comprises a scoring function for determining whether or not an offer or counteroffer has to be accepted, and wherein, if a scoring function value obtained by the ES for the order or any counteroffer made by the OS is higher than the scoring function value which would be obtained for a subsequent offer made by the ES in response to the order, then the order is accepted, otherwise, an offer is sent to the OS which will proceed to its evaluation using its own scoring function until an offer, or a counteroffer is accepted, or until the OS accepts an offer of another ES and refuses the offers of the other ES.

7. The method according to claim 2, which comprises, for each offer or counteroffer, automatically determining by the ES or by the OS a new value for one or several parameters involved in the order.

8. The method according to claim 7, which comprises determining the new value as a function of at least one of the following: a known deadline for completing a production of a requested product, a current quantity of an available resource, or a previous value change made for the parameter by the other negotiation partner.

9. A negotiation-based system configured for coordinating a distributed order management of a manufacturing execution system (MES), the negotiation-based system comprising:
a structure of distributed systems with at least one ordering system (OS) and one or a plurality of executing systems (ES);
said OS including:
a repository configured for storing planning and engineering data;
an order planning and engineering component configured for applying a business logic for order planning and order engineering; and
a negotiation model stored within the repository of the OS, said negotiation model being configured for automatizing negotiation steps of the negotiation process between said OS and said ES;
said ES including:
a repository configured for storing planning and execution data;
an order planning component configured for communicating with said order planning and engineering component of said OS and for triggering an execution of an accepted order or counteroffer;
an order execution component configured for applying business logic for order execution when an order or counteroffer has been accepted;
a negotiation model stored within said repository of said ES, said negotiation model being configured for automatizing negotiation steps of a negotiation process between said OS and said ES;
wherein said structure of distributed systems of the negotiation-based system is configured for performing the steps of the negotiation-based method according to claim 1.

10. The negotiation-based system according to claim 9, wherein said structure of distributed systems defines a set of autonomous and/or independent and distributed functionalities of the negotiation-based system that are able to act at different enterprise levels, and wherein said functionalities include at least a local order management functionality and a global order management functionality.

11. The negotiation-based system according to claim 9, wherein:
said structure of distributed systems is a hierarchical structure of an enterprise hierarchy comprising a set of different levels;
said OS is configured for providing a global order management running at a top level of the enterprise hierarchy; and
said ES is configured for providing a local order management running at a bottom level of the enterprise hierarchy with respect to the top level of the global order management.

12. The negotiation-based system according to claim 9, wherein the negotiation model defines a mechanism for coordinating and optimizing the management of MES orders, wherein said mechanism is based on negotiation protocols configured for optimizing a distribution and coordination of order management, wherein negotiation protocols are used to implement communication protocols where conflicts between participants may occur, each negotiation protocol being defined as a structured sequence of iterative steps in which the offers and counteroffers are iteratively exchanged between OS and ES until an agreement is reached or until the negotiation is closed.

13. The negotiation-based system according to claim 9, wherein the order management is a combination of a set of autonomous capabilities comprising a global order management functionality configured for providing global order planning and order engineering capabilities, and a local order management functionality configured for providing local order planning and order execution functionalities.

* * * * *